W. SCHENKER.
OIL ENGINE.
APPLICATION FILED AUG. 23, 1911.
1,176,252.      Patented Mar. 21, 1916.
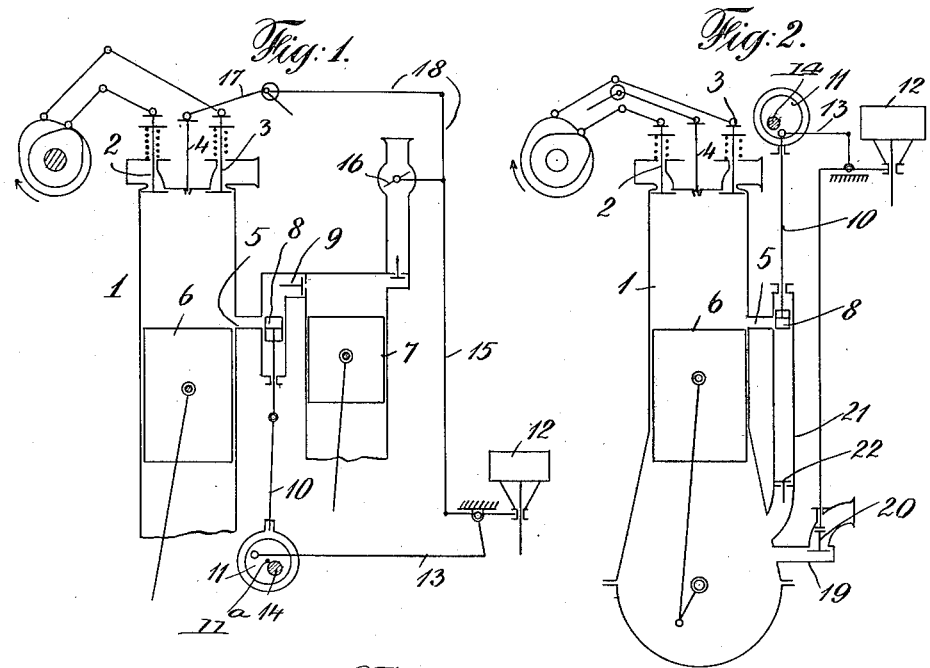
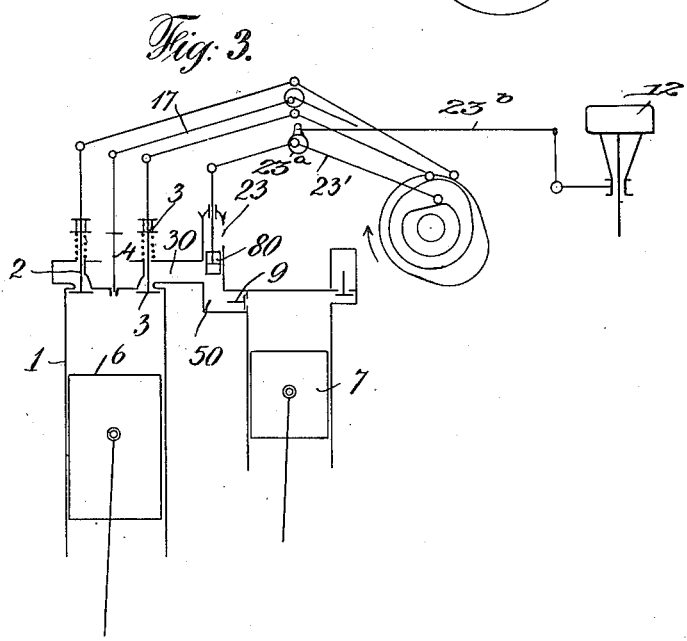
Witnesses:
Max B. A. Doring
H. E. Kimball
Walter Schenker, Inventor
By Attorney

UNITED STATES PATENT OFFICE.

WALTER SCHENKER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

OIL-ENGINE.

1,176,252.  Specification of Letters Patent.  Patented Mar. 21, 1916.

Application filed August 23, 1911. Serial No. 645,631.

*To all whom it may concern:*

Be it known that I, WALTER SCHENKER, a citizen of the Republic of Switzerland, and a resident of Winterthur, Canton of Zurich, Republic of Switzerland, have invented the following new and useful Improvements in Oil-Engines.

The invention is an improvement in oil engines of the general class wherein a charge of air is compressed by the piston and the fuel oil injected thereinto and ignited at or about the compression dead center.

The object of the invention is to augment the power derivable from such engines in accordance with and in order to accommodate increase of the load demand, and more particularly to increase the power of such engines by increasing the weights of the combustible charges of air and fuel that are ignited and burned therein on each working cycle.

The invention includes the means hereinafter described and claimed whereby such increased power may be obtained under normal or over-load conditions and also includes the special means for accomplishing the results stated and the organization and mode of operation thereof, as hereinafter pointed out.

The apparatus taken for illustration of the principle of operation of the invention is shown in the drawings hereto in schematic form, which will be readily and sufficiently understood by the engine builder to enable him to obtain all the advantages of the invention.

Figure 1 is a diagram of one embodiment of the invention having a separate air compressor for the supplemental air; Fig. 2 is an embodiment similar to Fig. 1 with a crank case air compressor; and Fig. 3 is a modified and preferred form.

The power of the engine is increased by adding an extra charge of compressed air to the normal charge of combustion air that is compressed by the piston and correspondingly and coincidentally increasing the amount of the fuel charge so that a greater combustion will be obtained and a more effective expansion will follow therefrom. For this purpose the engine is provided with the usual normal supply of air for the purpose of combustion, to be charged into the cylinder during the outward stroke of the piston in any of the usual manners. The supply of this air may be the atmosphere, as shown in the diagrams, or a reservoir containing air under low pressure. After such charge of atmosphere or low-pressure air has been introduced and the cylinder properly closed against its escape, air of higher pressure, from a separate and external source, is thereupon admitted, entering the cylinder before or while the piston is making and before it completes its air compressing stroke. The supplemental air thus introduced adds extra oxygen to the normal air charge and hence provides for the corresponding increase in the fuel charge injected at the end of the compression. The particular manner of introducing the supplemental air or of confining the normal charge against escape is not of consequence to the broadest aspects of the invention, but in four-cycle engines such air is preferably introduced through the same passage by which air for the normal working charge passes to the cylinder, and in any case its introduction to the cylinder is under control, either manual or automatic, and preferably the latter, so that the amount of combustible mixture in the cylinder will be promptly varied in accordance with requirements. It will be observed that increase in the fuel charge alone will not be sufficient to compensate for over-loads on the engine unless a corresponding increase of air for combustion is also added to the cylinder charge.

In each of the diagrams of the drawing, the engine cylinder 1 is provided with a mechanically operated exhaust valve 2, a mechanically operated air intake 3 and a fuel valve 4, the air valve 3 constituting in each case the passage by which the air from the atmosphere is taken into the cylinder. The fuel valve 4 is the ordinary spray valve such as commonly employed in Diesel engines, to which the present invention is particularly applicable. Such fuel valves operate to atomize the fuel oil with air of a pressure higher than the maximum compression pressure and inject the atomized mixture into the compressed air in the cylinder.

In Fig. 1 the cylinder is provided with a lateral port 5 uncovered by the working piston 6 at or near the end of its outward stroke and communicating with the source of higher pressure air. In the present case this high pressure source is constituted by an air compressor 7 driven by the engine crank shaft through ordinary connections for this purpose, which are not shown, but in place of the air compressor, a storage tank used also for other purposes could be substituted if desired. The port 5 is controlled by a valve 8 of any suitable design, herein for convenience shown as a slide valve, which is interposed between the engine cylinder and the force valve 9 of the compressor. The slide valve is actuated by an eccentric rod 10 from an engine driven eccentric mechanism 11, the stroke and period of the valve being under the control of the engine governor 12, and the latter being driven by the engine through appropriate gearing, also omitted from the diagrams. The mechanical agencies through which the governor exerts its control upon the slide valve will be determined by the design of the engine with which the invention is employed. In the case of the engine shown in the diagram, the governor actuates a link 13 which is connected to an eccentric sleeve carried by the member 14 by which the slide valve is reciprocated, the connecting rod 10 being provided with a strap surrounding the sleeve so that rotation of the latter will vary the relation of the rod to the actuating member, the object being to cause the slide valve to reciprocate in proper phase with the engine piston 1 but with a variable movement according to the control exerted upon it by the governor. The member 14 bearing the sleeve 11 revolves on the axis marked 11$^a$. In the normal running of the engine with a light or average load, the reciprocation of the slide valve as controlled by the governor, is insufficient to cause it to uncover the port 5 while the latter is also uncovered by the engine piston, so that thus no supplemental air from the high pressure source is admitted to the cylinder. When the power is to be increased to compensate overload, the reciprocation of the slide valve is automatically altered by the corresponding change in speed of the governor, so that it uncovers the port 5 during a part or the whole of the time that the latter is uncovered by the working piston, i. e. shortly before or at the beginning of the compression stroke, thereby allowing the higher pressure air to pass into the engine cylinder in greater or less amounts as determined by the pressure of the high pressure air source and the period for which the port 5 remains open. In cases where a compressor serves as the source of high pressure air, its operation may also be controlled by the governor, for which purpose a damper 16 is placed in the suction pipe of the compressor connected to the governor by a link 15 adapted to be operated thereby simultaneously with the change of shift of the slide valve so that when no supplemental air is needed, the suction damper will be closed and the compressor will run idly.

The amount of the fuel charge may be controlled simultaneously with the control of the density of the combustion air charge as above set forth, either by hand or by the operation of any suitable or usual governor controlled mechanism affecting either the operation of the fuel-oil pump or the period of operation of the fuel valve. In the case illustrated by Fig. 1, the lever 17 which actuates the fuel valve is carried on a shifting fulcrum, shifted by the governor through the connections indicated at 18, so that the fuel valve remains open a longer time when supplemental air is added to the normal charge, it being of course understood that the adjustment of the governor and its said connections is such that the supplemental amounts of fuel and of combustion air are supplied in proper proportions to each other and to the increased load on the engine.

The embodiment of the invention indicated by Fig. 2 is the same as that of the form just described excepting that the supplemental supply of high pressure air is in this case a compressor formed by the reverse face of the engine piston coöperating with the closed crank case of the engine. The intake pipe 19 for the crank-case is controlled by a suction valve 20 under the control of the engine governor 12, so that under conditions of light or no load, the said valve will be held open by the governor and no air will be compressed. The force pipe 21 leads from the crank case to a cylinder port 5, and is disposed in the same relation as the corresponding port in Fig. 1, being provided with a slide valve 8, which is connected with an eccentric mechanism 11 under the control of the governor. The fuel valve 4 is, or may be, likewise under the control of the governor by the same or equivalent means, as that shown in Fig. 1. On the occasion of overload in this form of engine the slide valve 8 opens the cylinder port 5 at or about the end of the piston's outward stroke to admit more or less air from the receiver pipe 21 into the charge of air already in the cylinder, the compression of such air taking place in the usual manner and being followed by the timely injection thereinto of the fuel when the compression has been completed.

In Fig. 3 the high pressure air source is directly connected to the normal air intake 30 of the engine cylinder and the slide valve 80 of this form serves the double purpose of controlling the admission of the low pressure, as well as of the high pressure, air. The low pressure or atmospheric air enters through the opening 23 and intake 30 when the slide valve is in its lower position and the high pressure air enters from the compressor through the force pipe 50 and intake 30, when the slide valve is in its raised position, the relative amounts of air from each source being determined by the stroke and period of the slide valve, which of course can be controlled by the governor as in the cases above described. For this purpose the fulcrum of the lever 23′ which operates the slide valve may be mounted eccentrically on a rock-shaft or part 23ᵃ properly connected to the governor 12 by a link 23ᵇ so as to be raised or lowered thereby. It will be understood, however, that the fulcrum of the slide valve lever may be held stationary, if desired, so as to admit constant amounts of air from the low and high pressure sources, alternately for each cycle of the normal operation of the engine, irrespective of whether the relative amounts of the air from such two sources be varied on occasion of overload.

From the foregoing it will be observed that the invention involves a novel method of compensating overloads in engines of the class described, which is applicable to existing engines by providing the same with an additional air supply of appropriate pressure and controlling the same and the fuel in the manner above described so that the charges of combustible mixture, larger than normal but with the same proportions of air and fuel, can be introduced into the engine cylinder when needed for increased power.

I claim—

1. In an engine of the kind described, a piston and cylinder supplied with separate sources of air of different pressures in combination with valve mechanism arranged to permit the piston to draw in a charge of the air of lower pressure during its suction stroke and including a device adapted to admit a supplemental charge of the higher pressure air during a period in advance of fuel injection, means for controlling such device whereby the admission of higher pressure air may be discontinued under light load and means for injecting the fuel at or about compression dead center.

2. In an oil engine a piston and cylinder and suitable valves whereby the piston draws in and compresses a charge of fresh air, and a fuel valve adapted to inject fuel oil into such charge on the completion of its compression, in combination with a supplemental supply of compressed air and governor-controlled means adapted to add variable amounts from such supply to the aforesaid charge in accordance with the engine load, the said governor-controlled means operating in advance of the fuel injection.

3. In an oil engine, a cylinder and piston and suitable valve mechanism whereby a charge of air is admitted to the cylinder during the outward stroke of the piston to be compressed thereby on the return stroke, and a fuel valve operative to mix fuel with such air on the completion of the compression thereof, in combination with an air compressor connected to supply additional air for combustion in advance of combustion and at a higher pressure to said charge and an engine governor controlling the operation of the compressor.

4. In an oil engine the combination with the piston and cylinder and suitable air-intake, exhaust and fuel valves whereby fuel is admixed with a charge of air previously compressed by the piston, of an air compressor driven by the engine and adapted to deliver supplemental air into the cylinder in advance of the combustion and an engine governor exerting simultaneous control upon the suction and delivery pipes of the air compressor.

5. In an oil engine a cylinder having an air inlet valve for admitting atmospheric air thereto, a piston for compressing such air and a fuel injection valve operative at or about the end of the air compression stroke, in combination with a source of compressed air, means operative in advance of the fuel injection for adding compressed air from said source to the charge of air in the cylinder, and means for simultaneously varying the amount of fuel and such added compressed air in accordance with the load on the engines.

6. In an oil engine, a piston and cylinder provided with air-intake and exhaust valves and a fuel valve and suitable means for operating the said valves on a four-stroke cycle, in combination with a source of compressed air, having communication with the cylinder and a valve for controlling such communication and means for opening the said valve at or about the early part of the air compression stroke of the piston.

7. In an oil engine a piston and cylinder having two sources of air to form the combustion charge, one of such sources being opened to communication with the cylinder during the suction stroke of the piston and the other source being an air pump adapted to deliver supplementary air to the cylinder subsequent thereto and in advance of fuel injection, in combination with means for varying the quantity of air delivered by such pump, a fuel injection device and a governor controlling the operation thereof.

8. In an oil engine a piston and cylinder having two sources of air to form the combustion charge, one of such sources being opened to connection with the cylinder during the suction stroke of the piston and the other being of higher pressure and opened to such connection subsequently to the other and in advance of the fuel injection, in combination with a fuel injection device operated at or about compression dead center, an air pump constituting the said source of higher pressure and an engine governor controlling the operation of such air pump.

9. In an oil engine a piston and cylinder having two sources of air to form the combustion charge, one of such sources being opened to communication with the cylinder during the suction stroke of the piston and the other source being an air pump subsequently connected with the cylinder and during a period in advance of fuel injection, in combination with a fuel-injecting device and engine governor means controlling the same to operate at or about compression dead center and also controlling the intake port of the said air pump.

10. In an oil engine, the combination of a combustion cylinder having a piston and suitable valves arranged to take in an air charge during the suction stroke, means for injecting the fuel into said air charge at or about compression dead center, a chamber co-acting with the reverse side of the piston to form a supplementary source of air, and means for admitting air from such chamber to the air charge in the cylinder in advance of fuel injection.

11. In an oil engine the combination of a cylinder and suitable valves arranged to take in a change of air during the suction stroke, an air pump incorporated in the engine structure, means for admitting air from such pump to the said suction charge in the cylinder in advance of the fuel injection, a fuel injecting means operative at or about compression dead center, an engine governor and means whereby such governor jointly controls the action of said valve and air pump.

12. In an oil engine, the combination of combustion space, a piston and suitable valves arranged to take in a charge of air during the suction stroke, an air pump, connections for admitting supplemental air from the pump to the air charge in the said space, said connections being adapted to open during a period preceding fuel injection, a device for injecting fuel into the combustion space at or about compression dead center, and engine governor, and means whereby such governor jointly varies the time of admission and the amount of the supplemental air delivered by said pump to the combustion space.

13. An internal combustion engine having a cylinder and piston, means for admitting a charge of air to the cylinder to be compressed by the piston on its inward stroke, and means for injecting fuel into such compressed air charge at or about combustion dead center, in combination with means for supplying supplemental compressed air to the cylinder in advance of fuel injection comprising an air compressor having communication with the cylinder, a valve controlling said communication, connections whereby periodic movement is imparted to said valve from the engine crank shaft, and governor-controlled means for varying the effective opening of said valve.

14. In a four-cycle internal combustion engine, a cylinder and piston, and air intake, exhaust and fuel injection valves whereby air is drawn in by said piston on the suction stroke and compressed on the return stroke and fuel is thereupon injected at or about compression dead center, in combination with means for supplying supplemental compressed air to the cylinder in advance of fuel injection comprising an air compressor having communication with the cylinder, a valve controlling said communication, connections whereby periodic movement is imparted to said valve from the engine crank shaft in such time that said valve tends to admit supplemental air following the drawing in of the regular charge of air by said piston, and governor-controlled means for rendering the opening of said valve effective at such times in response to higher loads on the engine.

15. An internal combustion engine having a cylinder and piston, means for admitting a charge of air to the cylinder to be compressed by the piston on its inward stroke, and means for injecting fuel into such compressed air charge at or about compression dead center, in combination with means for supplying supplemental compressed air to the cylinder in advance of fuel injection comprising an air compressor having communication with the cylinder, a valve controlling said communication, connections whereby periodic movement is imparted to said valve from the engine crank shaft, and governor-controlled means for shifting the path of reciprocation of said valve.

16. An internal combustion engine having a cylinder and piston, means for admitting a charge of air to the cylinder to be compressed by the piston on its inward stroke, and means for injecting fuel into such compressed air charge at or about compression dead center, in combination with means for supplying supplemental compressed air to the cylinder in advance of fuel injection comprising an air compressor having communication with the cylinder, a valve controlling said communication, connections whereby periodic movement is imparted to said valve from the engine crank shaft, and governor-controlled means for varying the time and amount of the opening of said valve.

In testimony whereof, I have signed this specification in the presence of two witnesses.

WALTER SCHENKER.

Witnesses:
 CARL CUBLER,
 AUGUST RÜEGG.